Aug. 19, 1958

L. D'INCERTI 2,847,902

PORTABLE PROJECTION APPARATUS FOR
DIAPOSITIVES AND MICROFILMS
Filed Dec. 3, 1954

Inventor
Ludovico D'Incerti

United States Patent Office 2,847,902
Patented Aug. 19, 1958

2,847,902
PORTABLE PROJECTION APPARATUS FOR DIAPOSITIVES AND MICROFILMS

Ludovico D'Incerti, Milan, Italy, assignor to Ferrania S. p. A., Milan, Italy

Application December 3, 1954, Serial No. 473,009

1 Claim. (Cl. 88—24)

Projectors are already known for diapositives and microfilms, which are mounted inside a box with a hinged lid, in which they are pivoted in such manner as to be capable of being adjusted from a rest position with the box closed to an operative position with the box open in order to project the image onto a screen associated with the lid of the box, when this lid is brought to a position parallel to the bottom of the box.

In these known apparatus, the projector is formed by a common lamp, the projection axis of which is kept always parallel to the bottom of the box and the screen is connected to the lid, from the side opposite to the hinges of the latter, so as to be capable of being disposed perpendicular to the lid when the latter is brought to a position parallel to the bottom of the box, in order to be possible to obtain between the light from the objective and the screen, the distance which is necessary for obtaining an image of the required dimensions.

The latter contributes to giving the box an exceptionally large size, particularly in the position for projection.

The object of the present invention is to obviate this disadvantage in a projector of the type set forth, while maintaining the same distance between the focus of the objective and the screen by an assembly of the different parts which is suitable for permitting the bottom of the box to be used directly as a screen in order to obtain an image of the same size as the said bottom.

More particularly, the portable projection apparatus for diapositives and microfilms according to the present invention is characterized in that the body of the projector is articulated, inside the box and by its end opposite to the projector, parallel to and from the side opposite that on which the lid is hinged, the interior of which lid, carried in a position perpendicular to the bottom of the box, forms the screen on to which the image received by a mirror forming the last optical element of the projector is reflected, after the latter has been brought, by rotation in a direction opposite to the lid, beyond the plane which passes through the pivot axis of the projector itself, perpendicular to the bottom of the box.

This feaure and other features of the apparatus according to the present invention will be more readily apparent from the following description of a preferred embodiment which is illustrated by way of example in the accompanying drawing, wherein.

Figures 1, 2:
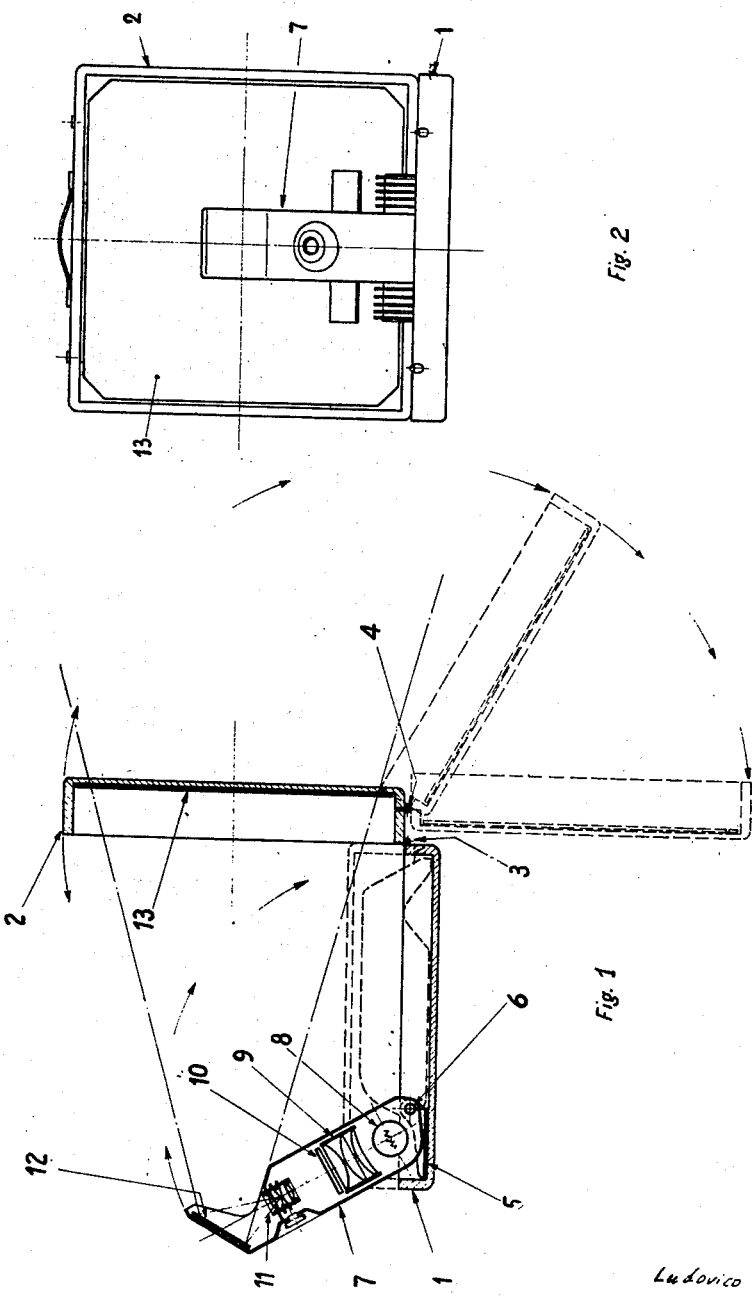
Figure 1 is a side elevation, partly in section, of this apparatus in its different positions.
Figure 2 is a front elevation thereof in the position of use, seen from the left of Figure 1.

This apparatus is formed by a small box, to the bottom 1 of which a lid 2 is connected by two hinges 3 and 4 in such manner as to enable it either to be disposed in a vertical position, being maintained there under the action of a latch device (not shown), or in a completely reversed position (broken lines). Fixed to the bottom of the box is a support 5, on which the body 7 of the projector is articulated by a pivot 6. Owing to this arrangement, the body 7, may pass by a simple rotational movement from the horizontal rest position (indicated by the broken lines in Figure 1) to the position of use (indicated by the full lines in the same figure). When the projector is in its rest position, it is exactly contained in the box and the lid of the latter may be closed.

The shape of the support 5 and its arrangement on the bottom of the box are such that the projector may reach a position of use enabling the dimensions of this box to be reduced to a minimum. Actually, in its rotational movement to the position of use, the body of the projector passes beyond the vertical, assuming a substantially inclined position with respect to the latter, on the side facing the cover; it is arrested in the established position by the action of a stop (not shown) formed on the support 5.

The different elements necessary for projection purposes are placed in succession in the body 7 of the projector, these being, the lamp 8, the compound condenser 9, the image carrier 10, the objective 11 with the corresponding focusing means. The luminous beam, projected upwardly along the axis of the body 7, is intercepted by a mirror 12 and reflected horizontally towards the lid of the box, in which a screen 13 is fitted.

When the lid is positioned vertically, the projected image is formed on the aforementioned screen and there is thus obtained a projection defined by the contour of the cover, this image being so bright that it may also be used in a room illuminated in normal manner. On the other hand, if it is desired to have a large image, it is sufficient completely to reverse the lid, in order to project on to another screen of any type (and even on to a plain light wall) at any distance.

The advantages of the apparatus which has been described as compared with known apparatus of the same type are obvious: very small size, particularly in the position for use; reduced weight and ease of transport; possibility of having two different forms of projection, one using the screen formed by the lid of the small box and the other on to another independent screen of any type; low running expenditure, because a lamp of limited power is sufficient in order to give a very bright image on the lid screen.

Having thus described my invention what I claim and desire to protect by Letters Patent is:

A portable projector arrangement for diapositives and microfilms comprising in combination: a box, said box including a lid hinged to said box and being swingable between a first position in which said lid closes said box and a second position in which said lid is substantially perpendicular to the longitudinal plane of said box, means for securing said lid in said second position, screen means provided on the inner face of said lid, a projector, one end of said projector being swingably mounted within said box, said projector being swingable relative to and within said box between an inoperative, collapsed position in which said lid may be closed and an operative, erect position in which said lid is in said second position, said projector in said erect operative position being inclined slightly rearwardly relative to the vertical plane of said box, and a light deflecting mirror mounted on the top end of said projector in the path of the optical axis of said projector as the last optical means thereof, said lid being movable from said second position to a third position where said lid is not in the path of the image projected by said projector, said mirror in the operative, erect position of said projector being capable of projecting images projected by said projector onto said screen means.

References Cited in the file of this patent

UNITED STATES PATENTS

| 2,231,395 | Schlegel | Feb. 11, 1941 |
| 2,712,266 | Cherauvrier | July 5, 1955 |

FOREIGN PATENTS

| 908,054 | France | Aug. 14, 1945 |
| 1,013,390 | France | Apr. 30, 1952 |